United States Patent [19]
O'Connor et al.

[11] Patent Number: 5,515,757
[45] Date of Patent: May 14, 1996

[54] ROTARY DIE CUTTERS

[75] Inventors: Barry J. O'Connor, Anderson, Ind.; Robert B. Vigder, Dayton, Ohio

[73] Assignee: Corfine, Inc., Muncie, Ind.

[21] Appl. No.: 22,149

[22] Filed: Feb. 22, 1993

[51] Int. Cl.⁶ .................................................. B26D 1/62
[52] U.S. Cl. ........................ 83/347; 83/659; 29/447; 29/895.212
[58] Field of Search .................. 83/347, 659; 29/447, 29/895.212; 492/56, 59

[56] References Cited

U.S. PATENT DOCUMENTS

| | | | |
|---|---|---|---|
| 3,139,826 | 7/1964 | Rainwater | 29/895.212 |
| 3,274,873 | 6/1964 | Sauer | 83/347 |
| 3,514,829 | 6/1970 | Blatt | 492/56 |
| 3,731,600 | 5/1973 | Earp | 83/659 |
| 3,959,573 | 5/1976 | Eddy et al. | 492/56 |
| 3,959,574 | 5/1976 | Seanor et al. | 492/56 |
| 4,037,299 | 7/1977 | Smith | 492/56 |
| 4,073,208 | 2/1978 | Kirkpatrick | 83/659 |
| 4,289,055 | 9/1981 | Von Schriltz | 83/659 |
| 4,372,246 | 2/1983 | Azar et al. | 492/56 |
| 4,770,078 | 9/1988 | Gautier | 83/344 |
| 4,848,204 | 7/1989 | O'Connor et al. | 83/659 |
| 4,930,205 | 6/1990 | Tasse | 29/895.212 |
| 4,982,639 | 1/1991 | Kirkpatrick | 83/659 |
| 5,083,488 | 1/1992 | Stanley et al. | 83/344 |

*Primary Examiner*—Rinaldi I. Rada
*Attorney, Agent, or Firm*—Biebel & French

[57] ABSTRACT

A removable and replaceable cover assembly for use on an anvil roll in a rotary die cutter in combination with a die roll equipped with non-serrated cutting blades consists essentially of inner and outer tubular layers of elastomeric material of different degrees of hardness, the outer layer being substantially harder than the inner layer. Since this tubular cover must be mounted on an anvil roll by relative endwise movement, the cover is disclosed in combination with a rotary die cutter having special provision for temporary removal, recovering and remounting of the anvil roll.

20 Claims, 8 Drawing Sheets

ROTARY DIE CUTTERS

BACKGROUND OF THE INVENTION

This invention relates to rotary die cutters for cutting blanks from paperboard and other web and sheet materials, and more specifically to covers for the anvil rolls in such die cutters.

It is the conventional practice on such rotary die cutters to utilize an elastomeric cover on the anvil roll as the cutting surface against which the dies on the die roll cut the feed stock. The elastomeric material most often used is polyurethane, typically of a hardness in the range of Shore A 80 to 95.

Polyurethane anvil roll covers are commonly provided in two general forms. One is a blanket having a sheet steel backing which wraps around the anvil roll and has its ends latched together and to the roll, an example of such blankets being disclosed in the co-owned O'Connor et al U.S. Pat. No. 4,848,204 of 1989. The other common form comprises a pair of semi-circular parts which wrap around supporting structure on the anvil roll that holds them in place, examples being disclosed in Sauer U.S. Pat. No. 3,274,873 of 1966 and Kirkpatrick U.S. Pat. No. 4,982,639 of 1991.

Blankets of both of these forms or types have been found satisfactory in combination with die rolls on which are mounted wood backed steel rule dies including blades having serrated cutting edges for most corrugated paperboard die cutting applications, but not for use where the cut edges of the blanks are required to be as smooth as possible. Serrated cutting edges leave an impression on the cut edge of the finished product which is not acceptable for high quality boxes and a wide variety of other products cut from paperboard, folding carton stock and many other materials.

This combination of blades and anvil roll cover is also not satisfactory for die cutting very thin, pliable or fibrous materials, which tend to be cut with jagged edges, torn or cut with a rolled edge rather than cut smoothly by serrated blades in combination with a soft anvil roll cover. A primary reason for this result is that serrated blade edges require a substantial degree of penetration of the anvil roll cover, and this requirement leads to tearing of the feed stock, especially with thin stretchable plastic film and the like. This problem is prevalent in the cutting of fiber-reinforced webs and non-woven fabrics, with which fibers tend to be embedded in the soft cover rather than cut, so that they dangle from the cut edge and must be separately trimmed.

One approach to this problem has been to use straight edge (non-serrated) blades on the die roll of a rotary die cutter, but this approach also has not thus far proved to be satisfactory. When such blades are used with an anvil roll having a relatively soft cover such as is used with serrated blades, thin, elastic, fibrous or otherwise flexible stock tends to be either not cut or torn rather than cut cleanly.

Attempts have also been made to use straight edge blades in combination with a metal anvil roll, but cleanly cut edges can then be obtained only when the blade edges just meet the surface of the anvil roll, and this requires very precise relative adjustment of the two rolls. Some flexibility in this respect can be obtained by resilient mountings for the blades in the die roll, but this involves complex mechanical means as well as undesirable metal-to-metal contact between the blade edges and the anvil roll which limits the effective life of the blades.

In an effort to overcome or eliminate these problems with past practices, the present inventors have experimented with die cutter blankets like those shown in their above patent but consisting of a pair of super-imposed polyurethane layers and a metal backing, with the outer polyurethane layer being much harder than the inner layer. That approach, however, proved to be unsatisfactory for two reasons.

In the first place, it is very difficult to maintain concentricity of the outer surface of the composite blanket, in part because it is difficult to wrap the sheet steel inner layer of the blanket into uniform contact with the anvil roll. Also, the latching structure at the ends of the blanket created similar difficulties as well as uneven thickness of the polyurethane.

The other reason for the unsatisfactory performance of a dual layer wrap-around blanket was that there was necessarily a junction line between the two ends of the blanket wrapped around the anvil roll, and whenever a blade on the die roll cut across that line, this caused a rough spot on the cut edge of the stock. For similar reasons, the multi-piece covers shown in the above Sauer and Kirkpatrick patents do not produce smooth edges when used with die rolls equipped with non-serrated cutting blades.

SUMMARY OF THE INVENTION

The primary purpose of the present invention is to provide a cover for the anvil roll of a rotary die cutter which will function in combination with a die roll equipped with non-serrated cutting blades to produce blanks having smooth cut edges from a wide variety of stock, including not only paperboard but also very thin, very pliable and fibrous materials, such as thin plastic sheeting, non-woven fabric web stock, kraft paper and many other materials.

This purpose has been accomplished in accordance with the invention by the provision of circumferentially continuous tubular anvil roll covers consisting essentially of an outer tubular layer composed of polyurethane or like elastomeric material of a relatively high degree of hardness, and an inner tubular layer composed of like material of a relatively low degree of hardness. Since such covers have no seam or cut edge as in the case of wrap-around blanket covers, and since also they have no underlying latch structure, they do not offer the problems discussed above when used in combination with non-serrated knives or blades on the die roll.

Since the anvil roll covers of the invention are tubular, they can be assembled on an anvil roll only by relative axial movement of the roll and cover, as contrasted with the wrap-around technique of our above U.S. Pat. No. 4,848,204 and with the technique for mounting the covers of the above Sauer and Kirkpatrick patents. It is therefore necessary to accomplish the purposes of the invention that the anvil roll to be covered be accessible from at least one end thereof for endwise mounting of a cover thereon. There is accordingly described hereinafter a rotary die cutter constructed to facilitate temporary removal of the anvil roll for recovering and ready return thereof to its operative position.

It is desirable for the preferred operation of a rotary die cutter equipped with non-serrated cutting blades that the anvil roll cover be secured to the anvil roll rather than free to rotate thereon. This result is accomplished in accordance with the invention by shrink fitting the cover on the anvil roll after the cover is first heated to a temperature causing it to expand sufficiently for slip fitting on the anvil roll by relative axial movement thereof. Since the anvil roll cover of the invention has no metal supporting layer, such as is conventionally provided on wrap-around blankets, a worn cover can simply be cut from end to end for quick and easy removal from the anvil roll and replaced by a shrink fit new tubular cover.

Other objects and advantages of the invention will be apparent from the following description, the accompanying drawings, and the appended claims.

DESCRIPTION OF THE PREFERRED EMBODIMENT

Figure 2:
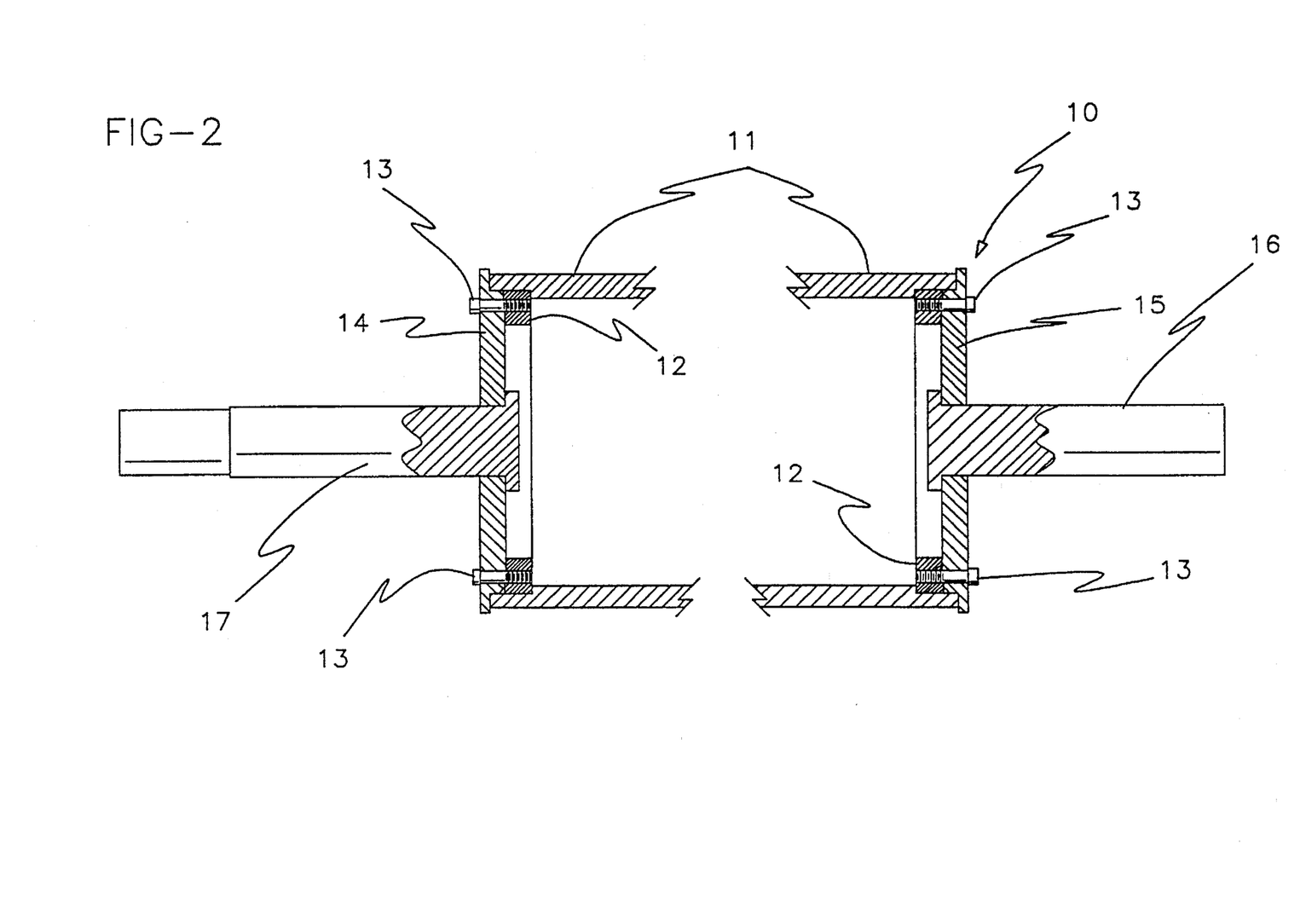
FIG. 2 is a similar view of the anvil roll shown in FIG. 1 without a cover but having stub shafts secured to each end thereof for mounting in a rotary die cutter.
Figure 3:
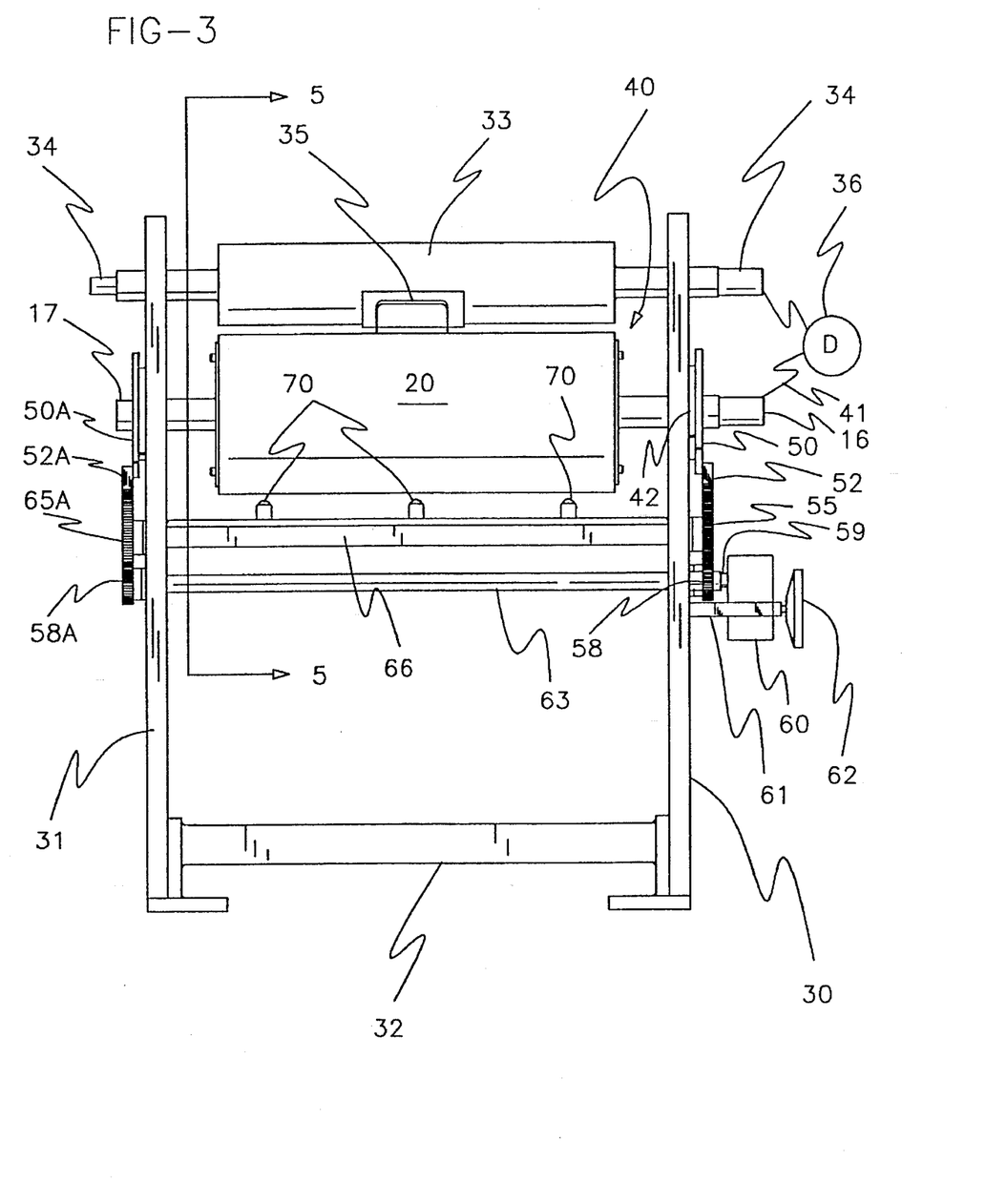
FIG. 3 is a side elevation of a rotary die cutter equipped with a die roll having a die with cutting blades thereon and an anvil roll constructed in accordance with the invention.

FIG. 2 illustrates the essential parts of a rotary die cutter anvil roll 10, which comprises a cylindrical shell 11 of ferrous metal having a ring 12 welded within each end thereof. The rings 12 are drilled and tapped to receive bolts 13 by which end heads 14 and 15 are secured to the opposite ends of the shell 11. A drive shaft 16 is secured to the end head 15, and a similar shaft 17 is secured to the end head 14, the shaft 17 being longer than the shaft 16 for reasons described hereinafter.

Figure 1:
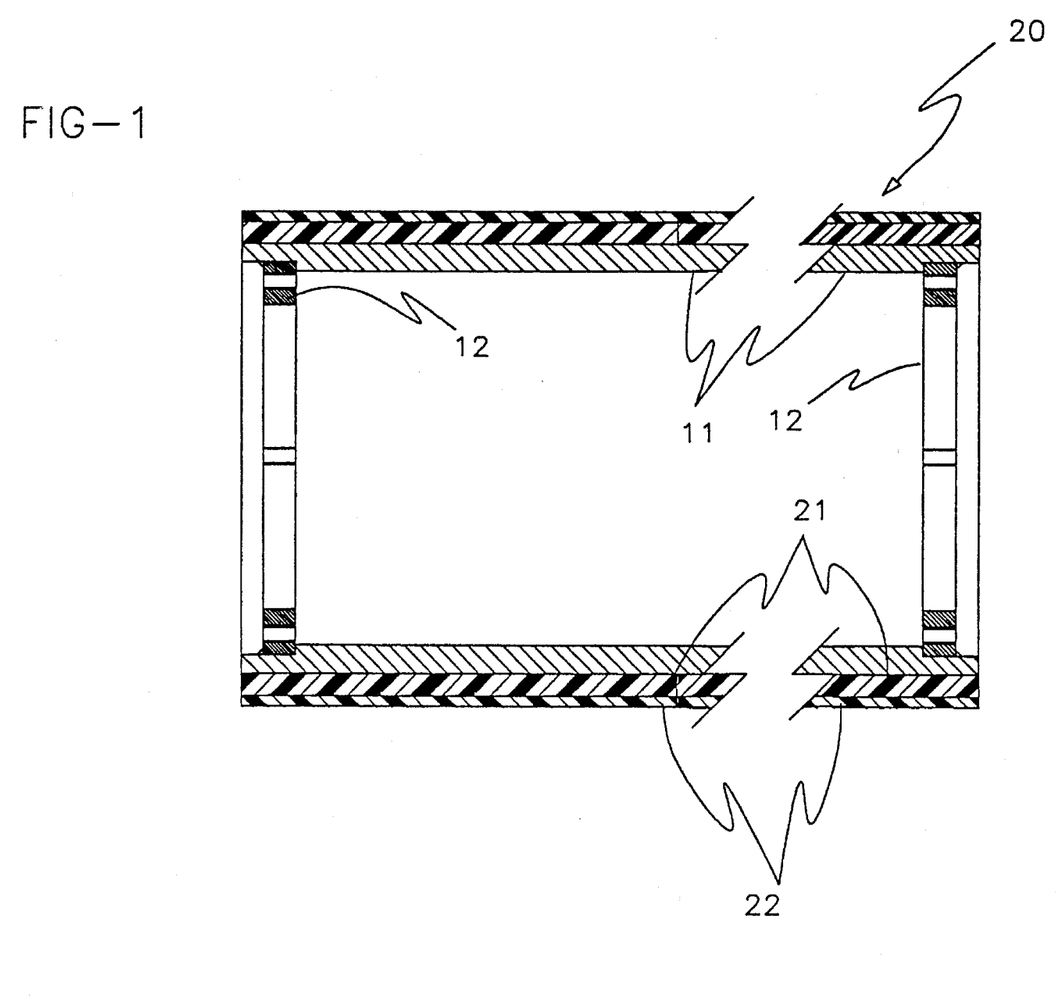
FIG. 1 is a fragmentary view in axial section of an anvil roll for a rotary die cutter equipped with a tubular dual layer cover constructed in accordance with the invention.

FIG. 1 shows the anvil roll shell 11 provided with a circumferentially continuous cover assembly 20 embodying the invention which consists essentially of a circumferentially continuous inner layer 21 composed of elastomeric material of a relatively low degree of hardness, and a circumferentially continuous outer layer 22 composed of elastomeric material of a relatively high degree of hardness. For example, preferred results in the practice of the invention have been obtained with the inner layer 21 composed of polyurethane of a hardness of Shore A 80, and with the outer layer 22 composed of polyurethane of a hardness of Shore D 70.

For use on an anvil roll shell having an outer diameter of the order of 10 inches, the thickness of each of these layers may be in the range of 0.187 to 0.250 inch. Usually the softer inner layer 21 will be thicker than the outer layer 22, e.g. with the two layers having thicknesses of 0.250 and 0.187 inch respectively. The double layer cover 20 may be manufactured by any conventional technique, e.g. spin casting or molding, which will result in layers 21 and 22 having their mating surfaces bonded together.

For optimum results, the dual layer cover 20 should have at room temperature an inner diameter approximately 0.060 inch less than the outer diameter of the anvil roll shell 11. In order to mount such a cover 20 on a roll shell 11, the cover is heated until it has expanded sufficiently to provide for slip fitting of the heated cover on the anvil roll shell. For example, satisfactory results have been obtained if the cover is heated for 10 to 12 minutes at 210° F., and is then allowed to cool for at least two hours at room temperature after it has been slipped on the anvil roll shell.

For preferred results, as well as convenience, the cover 20 is fabricated in sections not more than about 10 inches in length, and a proper number of heated sections is mounted on the anvil roll and held in place by suitable fixtures during cooling. Then after the cover has been shrink fitted on the roll, the covered roll is machined to establish uniform concentricity of the surface of the hard outer cover layer 22.

The rotary die cutter shown in FIGS. 3–8 includes end frames 30 and 31 connected by suitable bracing 32. The die roll 33 has shafts 34 at each end by which it is mounted for rotation in the top of the frames 30–31, and it is shown as provided with one set 35 of knives, blades or rules. Die roll 33 may be driven by any conventional drive as indicated diagrammatically at 36. The same drive source can also drive the anvil roll assembly 40, as indicated at 41, preferably through a conventional transmission which causes roll 40 to travel at a lower peripheral speed than roll 33 when it is not in engagement with knives on roll 33 in order to prevent such knives from repeatedly striking the same areas on the cover 20 on anvil roll assembly 40.

The anvil roll assembly 40 is shown as of the same construction already described in connection with FIG. 2, and as having thereon a dual layer tubular cover 20 as already described in connection in FIG. 1. The anvil roll 40 has its shafts 16 and 17 supported in the frames 30 and 31 by means operable to move the roll 40 from a raised position in operative engagement with the blade set 35 and a lowered position wherein it can be separated from its shafts and removed for replacement of the cover 20.

Figure 4:
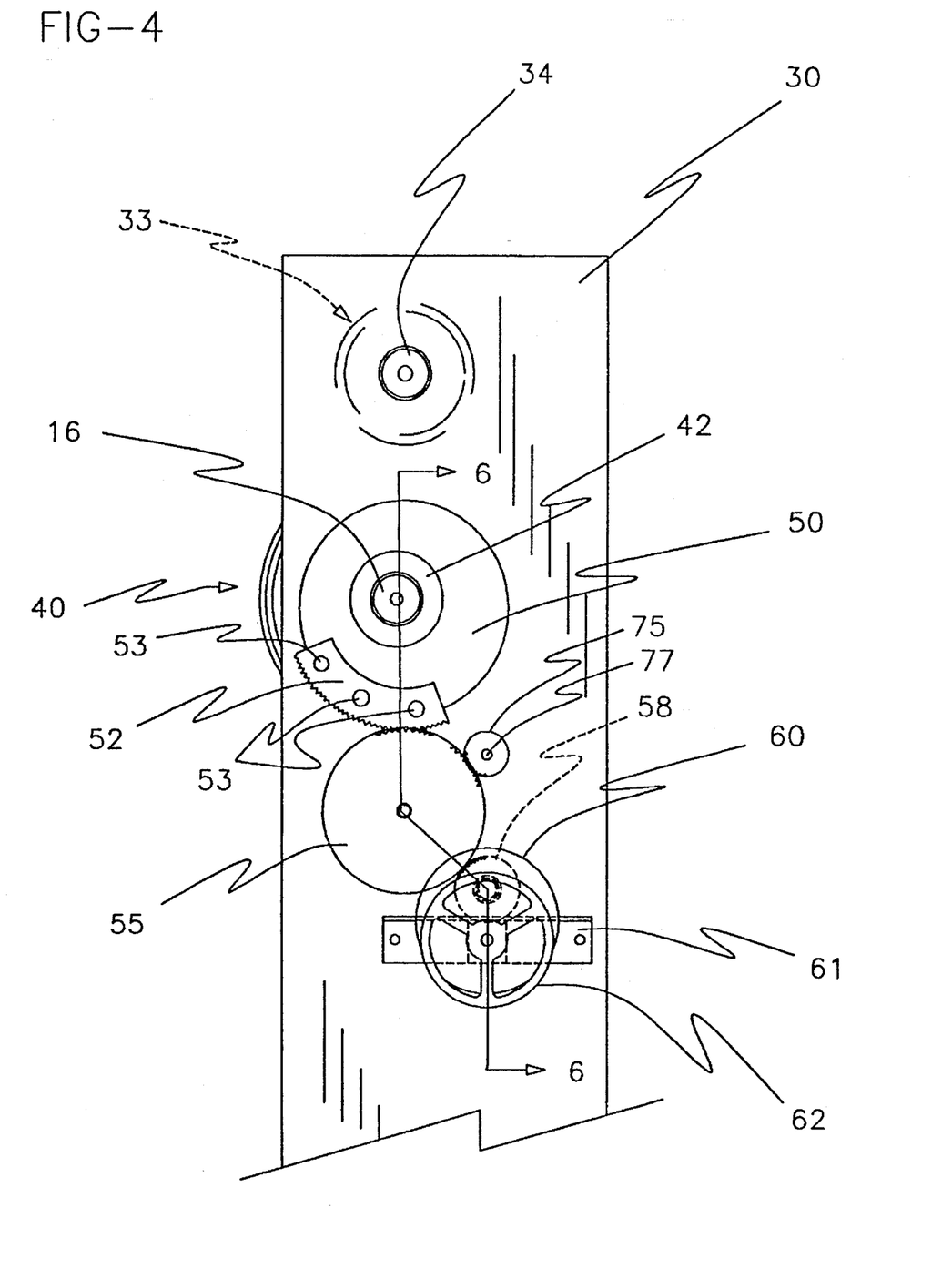
FIG. 4 is an elevational view looking from right to left in FIG. 3.
Figure 5:
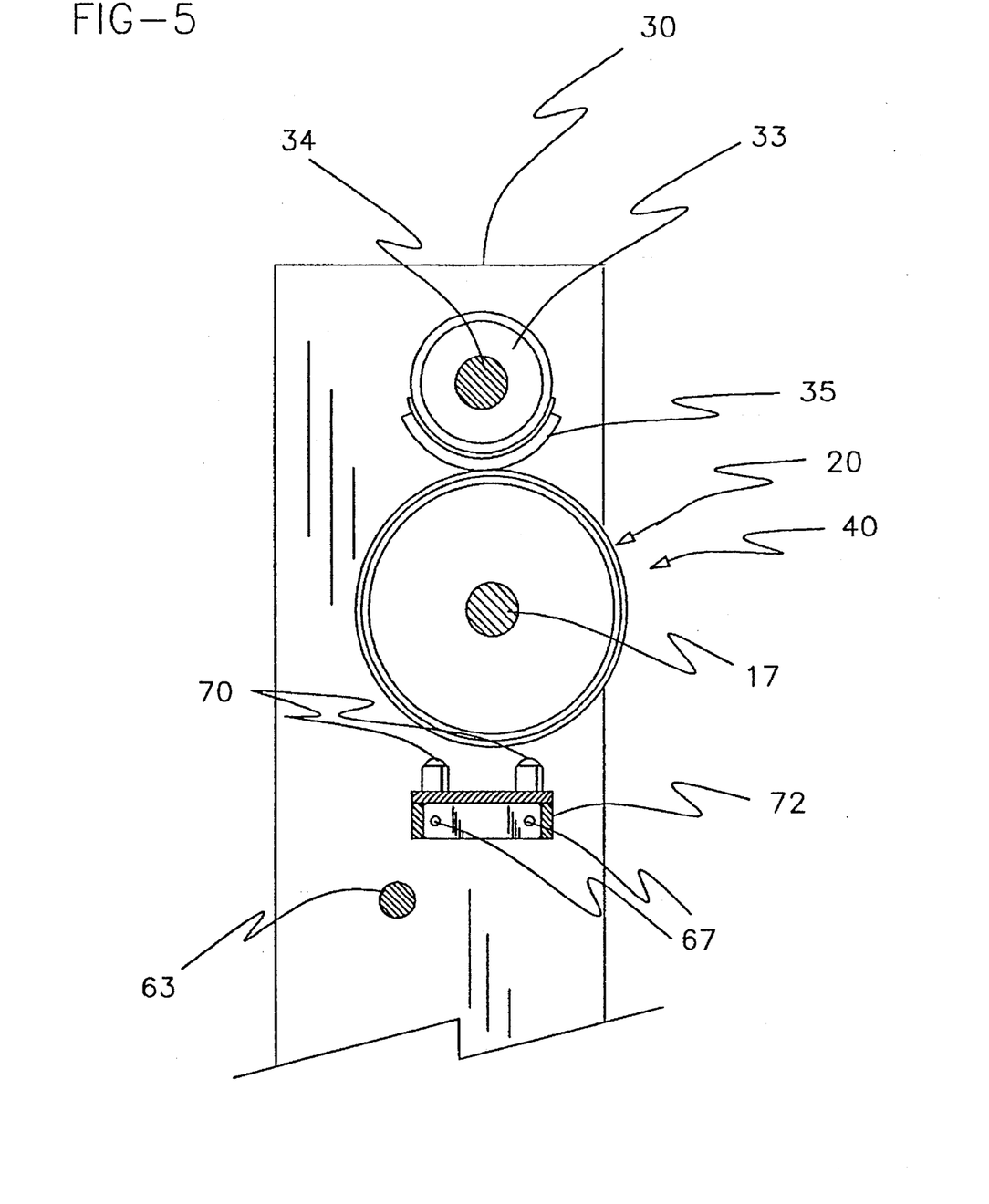
FIG. 5 is a partial section on the line 5—5 in FIG. 3.
Figure 6:
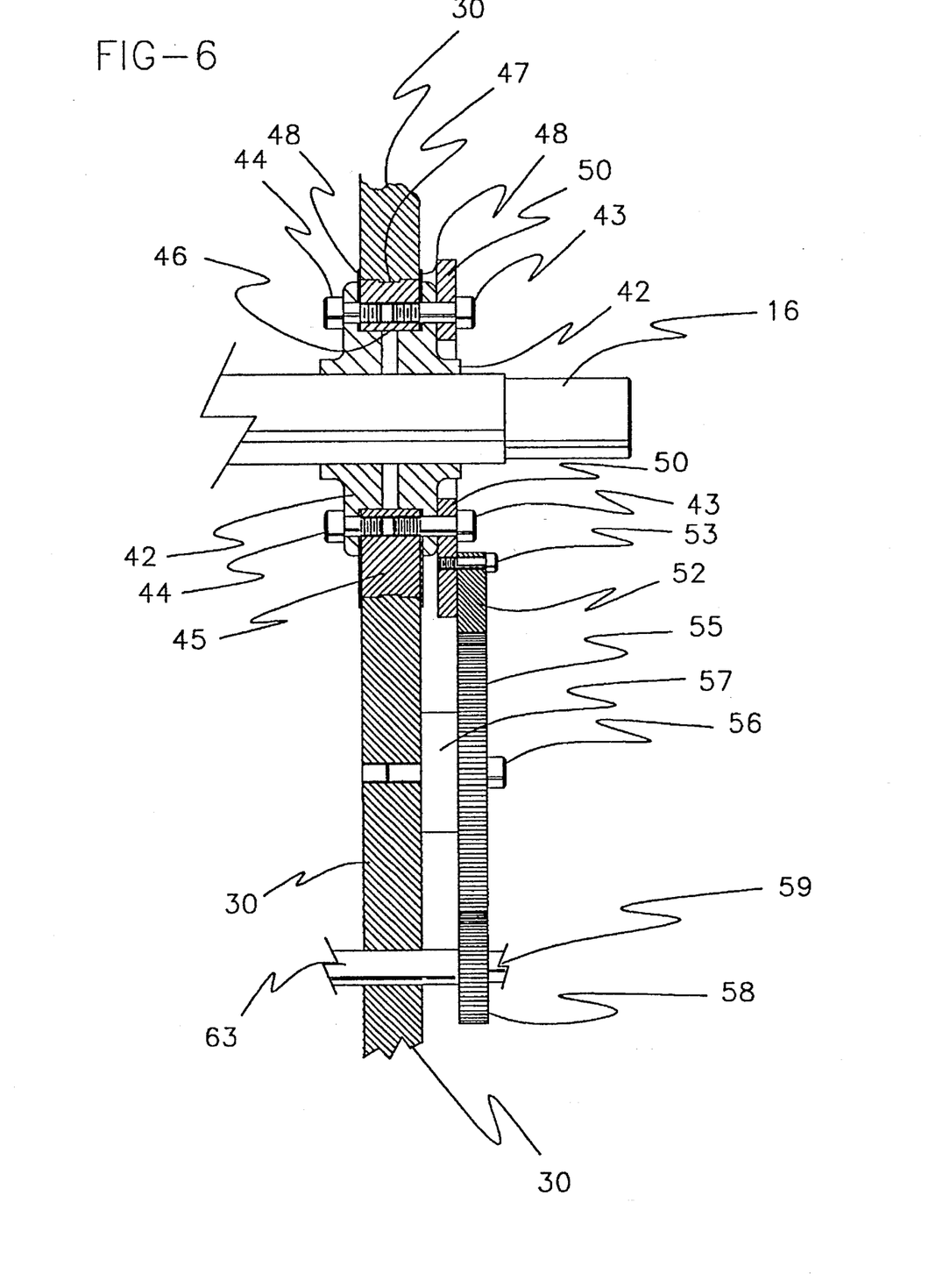
FIG. 6 is an enlarged fragmentary section on the line 6—6 in FIG. 4.

Referring specifically to FIGS. 4 and 6, the anvil roll drive shaft 16 is journalled in twin piloted flange bearings 42 secured together by bolts 43 and 44 on opposite sides of a cylindrical ring 45 having therein an eccentrically located cylindrical opening 46 which receives the pilot portions of the bearings 42. The ring 45 is received and can be rotated in a cylindrical hole 47 in the frame 30, and it is retained by complementary eccentric rings 48, of larger outer diameter, which are held in place by the bolts 43–44.

An eccentric ring 50 is mounted on the outer bearing 42 by the bolts 43, and a gear segment 52 is mounted on the outer side of this ring 50 by bolts 53. This gear segment 52 meshes with a large idler gear 55 which is mounted for rotation on the end frame 30 by a shoulder bolt 56 and spacer 57. The idler gear 55 meshes with a smaller drive gear 58 on the output shaft 59 of a gear box 60 mounted on the outside of the end frame 30 by brackets 61 and having an input shaft provided with a hand wheel 62.

The eccentric mounting and associated gears for raising and lowering the anvil roll drive shaft 16 are duplicated at the other end frame 31 for the roll shaft 17. A cross shaft 63 extends from the output shaft 59 of the gear box 60 to and through the end frame 31. A drive gear 58A on the opposite end of this cross shaft meshes with an idler gear 65A meshing with a gear segment 52A mounted on an eccentric ring 50A bolted to the eccentrically mounted bearings by which the anvil roll shaft 17 is supported in the end frame 31. Gear segments 52 and 52A are used because the range of rotation of the rings 50 and 50A is less than 90°, and a single ring gear can therefore be cut into quarters and used for the gearing on two of the cutters of the invention.

It will accordingly be seen that when the hand wheel 62 is rotated in one direction, the result will be to rotate the eccentric ring 50 in counterclockwise direction as viewed in FIG. 4. The ring 50A will rotate in the same direction as ring 50, and the anvil roll shafts will thereby be lowered, and also moved to the right from the position shown in FIG. 4. When the hand wheel is rotated in the opposite direction, this will cause the anvil roll assembly to move upward and to the left as viewed in FIG. 4 until it is again in working engagement with the die roll knives 35.

Figure 7:
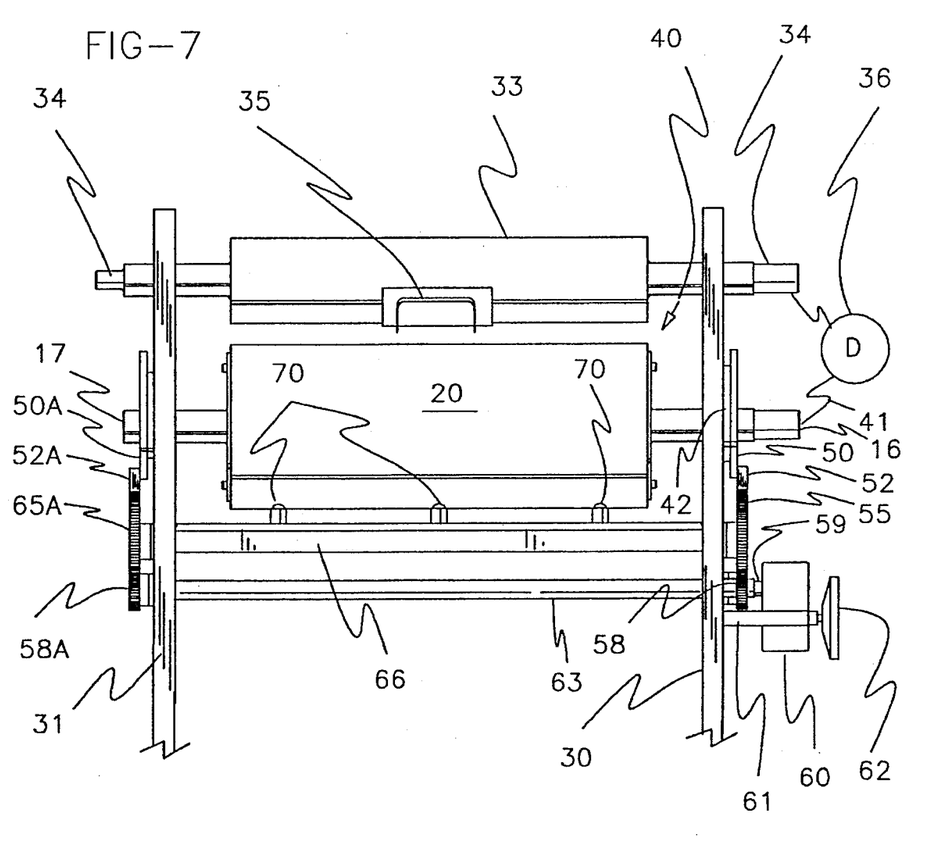
FIG. 7 is a partial view similar to FIG. 3 but showing the anvil roll lowered from its raised operating position to a rest position in preparation for replacement of the cover thereon.

Provision is made for receiving and supporting the anvil roll assembly 40 in a predetermined lowered position wherein it is free from engagement with the blade set 35 on the die roll 33. More specifically, a saddle 66 of inverted box shape extends between and is secured at opposite ends to the end frames 30 and 31 by bolts 67 so that it supplements the bracing action of the brace 32. Two or more pairs of laterally spaced and upwardly projecting ball bearing assemblies 70 are mounted on the top of the saddle 66 below the anvil roll assembly 40. These ball bearings receive and cradle the anvil roll when it is lowered by operation of the hand wheel 60 as already described, and this position of the parts is shown in FIG. 7.

After the anvil roll has been moved to its lowered position, the bolts 13 are removed from each of the end heads 14 and 15 in order to detach the anvil roll from its shafts 16 and 17. The drive shaft 16 can remain axially fixed in position in the end frame 30, but the shaft 17 can be moved axially, as shown in FIG. 8, to a sufficient distance so that the roll 40 can be similarly moved axially on the ball bearings 70 a sufficient distance to separate it from its drive shaft 16.

Figure 8:
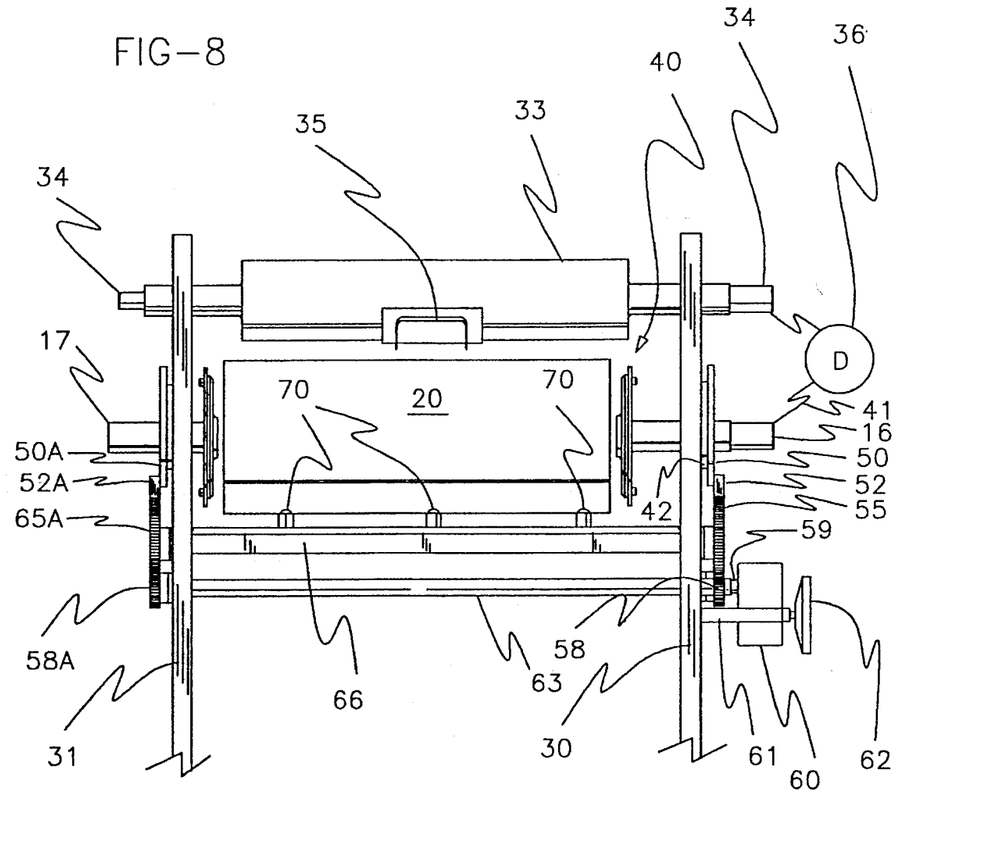
FIG. 8 is a partial view similar to FIG. 7 but showing the anvil roll detached from its shafts in preparation for recovering.

This position of the parts is shown in FIG. 8, and in the practice of the invention, the entire anvil roll assembly 40 can then be removed to an appropriate working location where its cover 20 can be removed and replaced. Since each cover 20 is a cylindrical tube, or a plurality thereof, held on the roll shell by shrink fitting, it can be removed by a simple slit and separate procedure. The replacement cover is then mounted on the remaining bare shell 11 as already described, namely by heating the replacement cover until it has expanded sufficiently for slip fitting on the shell, followed by cooling to complete the shrink fitting process, and then by machining as needed to achieve concentricity as already described.

After the roll assembly 40 has been provided with its new cover, it is returned to the cutter and raised to its operating position by operating the hand wheel 62. It is important that this aspect of the cutter shown in FIGS. 3–8 also provides for accurate adjustment of the anvil roll assembly 40 to the spaced relation with die roll 33 wherein penetration of the knife set 35 past the surface of the cover 20 is no more than is needed for complete cutting and optimum smoothness of the cut edges of the stock being run on the cutter, which has been found to be in the range of 0.005 to 0.010 inch as contrasted with the 0.030 to 0.090 inch typically needed for serrated blades.

In order to assure that the anvil roll 40 remains in the proper adjusted position during operation of the cutter, means should be provided for locking it in such position. For example, locking means for this purpose may comprise an idler gear 75 mounted on the frame 30 by a cap screw 77 so that it is in mesh with the idler gear 55. In use, the cap screw 77 is loosening during movement of the roll 40 for cover-changing or adjustment purposes, so that the gear 75 can rotate with the gear 55, and then when the roll 40 is raised to the proper washing position, screw 77 is tightened to clamp gear 75 to frame 30 so that gear 75 covers gear 55 against further movement.

It is to be understood that the rotary die cutter of the invention is not limited to use with cutting blades having non-serrated edges. However, when the cutter is used with a die roll provided with blades having serrated edges for conventional die cutting operations, a conventional anvil roll cover, which is softer than the cover of the invention, should be used in order to provide for sufficient penetration of the cover to assure complete cutting.

While the forms of apparatus herein described constitute preferred embodiments of the invention, it is to be understood that this invention is not limited to these precise forms of apparatus, and that changes may be made therein without departing from the scope of the invention, which is defined in the appended claims.

What is claimed is:

1. A rotary die cutter comprising:
   (a) a frame,
   (b) a die roll mounted for rotation in said frame and having on the outer surface thereof blade means having cutting edges,
   (c) an anvil roll including shaft means at each end thereof by which said anvil roll is mounted for rotation in said frame below said die roll,
   (d) means forming detachable connections between said anvil roll and said shaft means, and
   (e) means operative following detachment of said connections for effecting relative axial movement of said anvil roll and said shaft means to release said anvil roll for lateral movement out of said frame.

2. A rotary die cutter as defined in claim 1 further comprising means carried by said frame for moving said anvil roll between a raised operative position with respect to said die roll and a lowered position spaced from said die roll, and means in said frame for supporting said anvil roll in said lowered position following detachment of said detachable connections.

3. A rotary die cutter as defined in claim 2 wherein said supporting means comprises a support fixed to said frame below said anvil roll, and plurality of pairs of ball bearings on the upper surface of said support for cradling said anvil roll.

4. A rotary die cutter as defined in claim 2 further comprising means for clamping said moving means with respect to said frame to hold said anvil roll in a fixed position with respect to said die roll.

5. The method of covering a rotary die cutter anvil roll of predetermined outer diameter which comprises the steps of:
   (a) heating a circumferentially continuous tubular cover of elastomeric material having a room temperature inner diameter less than said anvil roll outer diameter,
   (b) continuing said heating until said inner diameter is greater than said anvil roll outer diameter,
   (c) mounting said heated cover on said anvil roll by relative lengthwise movement thereof, and
   (d) cooling said heated cover to effect shrink fitting thereof on said anvil roll.

6. The method as defined in claim 5 wherein said anvil roll is initially positioned between end frames of said die cutter, and wherein said method comprises the step of removing said anvil roll from between said end frames to expose one end of said roll for reception of said cover.

7. The method of covering an anvil roll wherein a cover is mounted on said anvil roll according to claim 6 and thereafter is removed from said anvil roll by slitting from end to end.

8. The method as defined in claim 5 wherein said cover comprises laminated inner and outer tubular layers, said outer tubular layer being substantially harder than said inner tubular layer.

9. In a rotary die cutter including a die roll equipped with blade means having non-serrated cutting edges, and an anvil roll cooperating with said die roll to cut sheet material passing therebetween, the improvement comprising a removable and replaceable cover assembly on said anvil roll consisting essentially of:

(a) a circumferentially continuous radially outer tubular layer consisting essentially of elastomeric material of a relatively high degree of hardness, and (b) a circumferentially continuous radially inner tubular layer consisting essentially of elastomeric material of a predetermined relatively low degree of hardness.

10. The improvement defined in claim 9 wherein said inner layer has a hardness of the order of Shore A 80, and said outer layer has a hardness of the order of Shore D 70.

11. The improvement defined in claim 9 wherein the inner diameter of said cover assembly is less than the outer diameter of said anvil roll at room temperature by a margin such that when heated above room temperature, said cover assembly expands to an inner diameter of a value sufficiently greater than said anvil roll diameter to provide for slip fitting of said cover assembly on said anvil roll followed by shrink fitting of said cover assembly on said anvil roll upon cooling to room temperature.

12. The improvement defined in claim 10 wherein each of said layers is composed of polyurethane.

13. A method of recovering an anvil roll of predetermined outer diameter which is initially covered by an old anvil roll cover and which is mounted between end frames of a rotary die cutter, said method comprising the steps of:

(1) temporarily supporting said anvil roll intermediate said end frames;

(2) dismounting said anvil roll from said end frames;

(3) removing said old anvil roll cover from said anvil roll;

(4) heating a new anvil roll cover having a continuous circumferential configuration and a room temperature inner diameter slightly less than said anvil roll outer diameter;

(5) expanding said new anvil roll cover by continuing said heating until said inner diameter exceeds said anvil roll outer diameter;

(6) inserting said anvil roll into said new anvil roll cover while said new anvil roll cover is expanded as aforesaid;

(7) causing said new anvil roll cover to cool to room temperature and become shrink fitted about said anvil roll; and (8) remounting said anvil roll between said end frames with said new anvil roll cover fitted thereon.

14. A method according to claim 13 wherein said heating is continued for approximately 10 to 12 minutes at a temperature of about 210 deg F.

15. A method according to claim 13 wherein said heating and expanding steps are performed upon a plurality of new anvil roll covers, each having a configuration and internal diameter as aforesaid and a length such that said plurality have a combined length for substantially covering said anvil roll, said anvil roll being inserted as aforesaid for different distances into each of said new anvil roll covers.

16. A removable and replaceable cover assembly for use on an anvil roll in a rotary die cutter, especially in combination with a die roll equipped with blade means having non-serrated cutting edges, consisting essentially of:

(a) a circumferentially continuous radially outer tubular layer composed of elastomeric material of a relatively high degree of hardness in the order of Shore D 70, and (b) a circumferentially continuous radially inner tubular layer composed of elastomeric material of a relatively low degree of hardness in the order of Shore A 80.

17. A removable and replaceable cover assembly for use on an anvil roll in a rotary die cutter, especially in combination with a die roll equipped with blade means having non-serrated cutting edges, consisting essentially of:

(a) a circumferentially continuous radially outer tubular layer composed of elastomeric material of a relatively high degree of hardness, and (b) a circumferentially continuous radially inner tubular layer composed of elastomeric material of a relatively low degree of hardness;

said cover assembly having a predetermined internal diameter at room temperature and thermal expansion characteristics such that upon heating to a temperature of 210 deg F., said roll cover has an expanded internal diameter greater than said predetermined internal diameter by a sufficient amount to enable reception of an anvil roll having an outer diameter intermediate said predetermined internal diameter and said expanded internal diameter.

18. An anvil roll cover as defined in claim 17 wherein said inner layer has a hardness of the order of Shore A 80, and said outer layer has a hardness of the order of Shore D 70.

19. An anvil roll cover as defined in claim 17 wherein each of said layers is polyurethane.

20. An anvil roll cover as defined in claim 19 wherein said inner layer has a hardness of the order of Shore A 80, and said outer layer has a hardness of the order of Shore D 70.

* * * * *